T. J. CLARKE & A. ILLY.
MACHINE FOR MAKING ROUND BOXES.
APPLICATION FILED MAY 16, 1914.
1,300,211.
Patented Apr. 8, 1919.
4 SHEETS—SHEET 2.
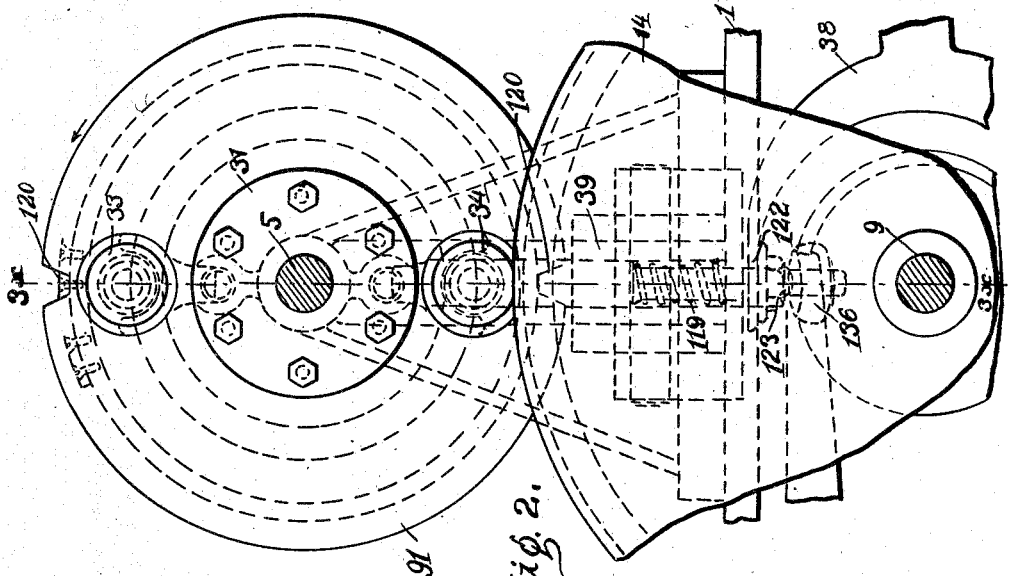
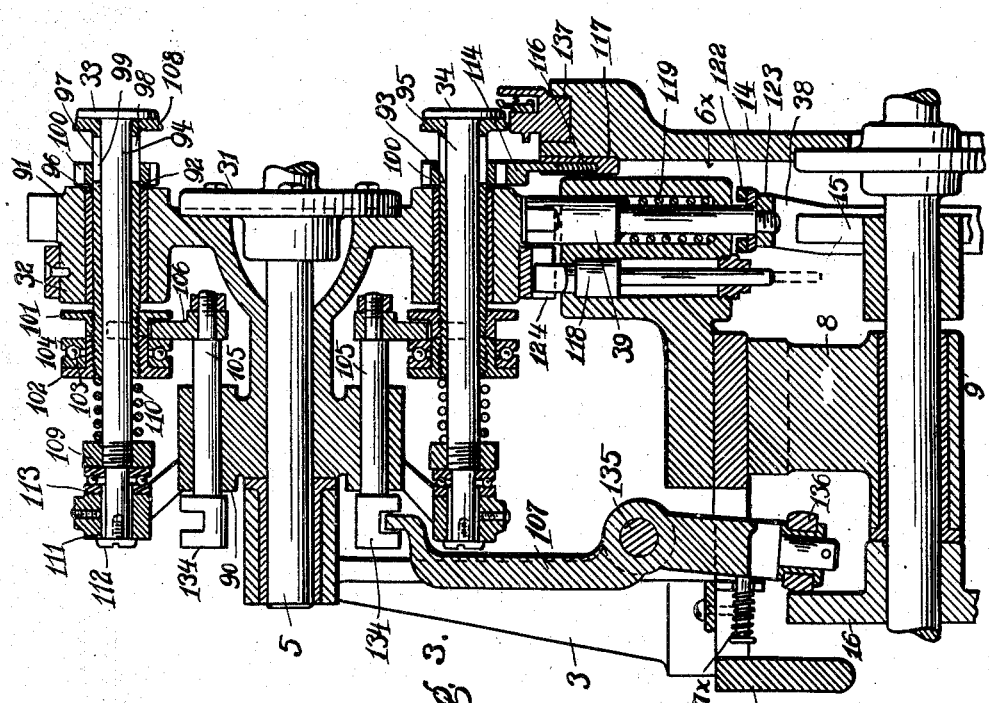

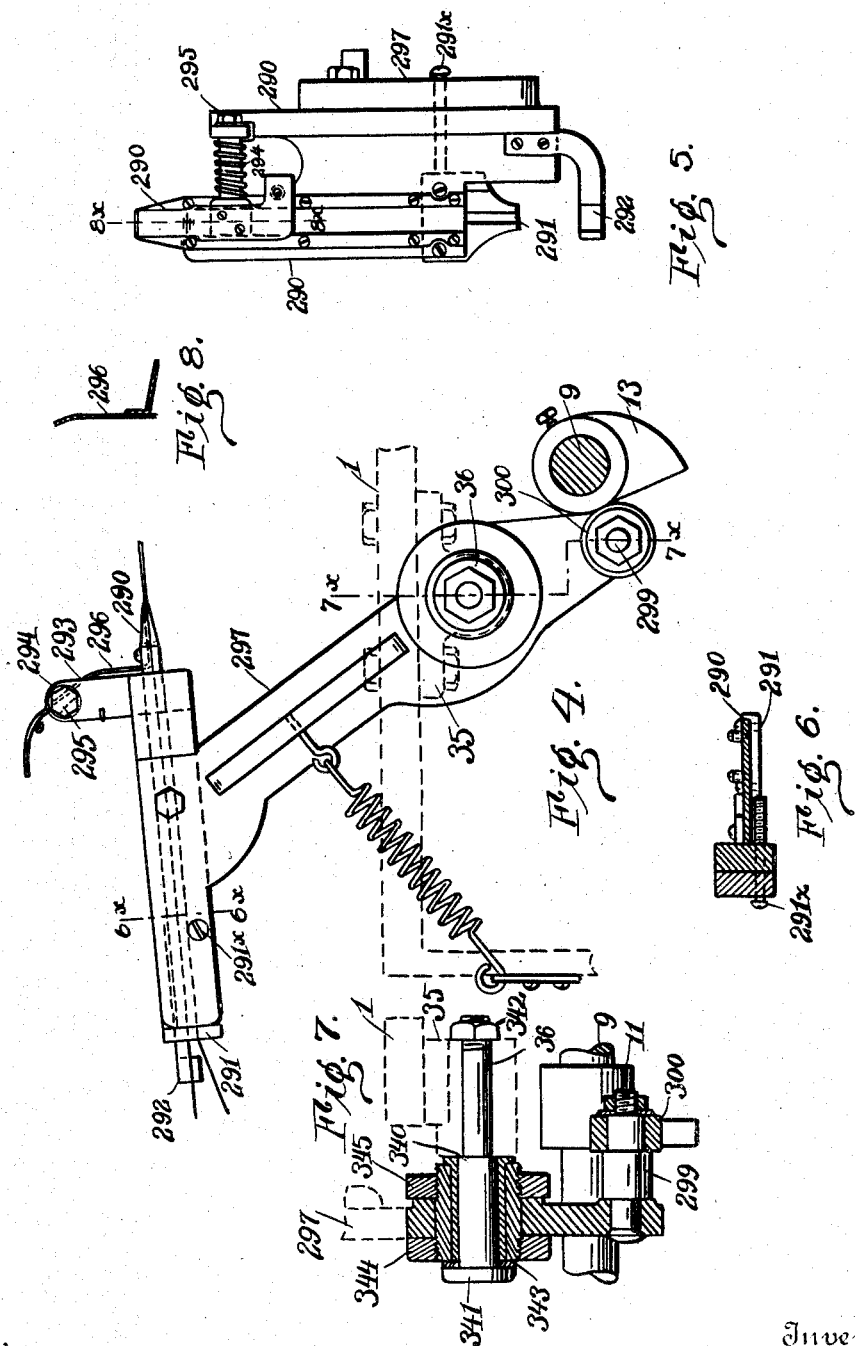

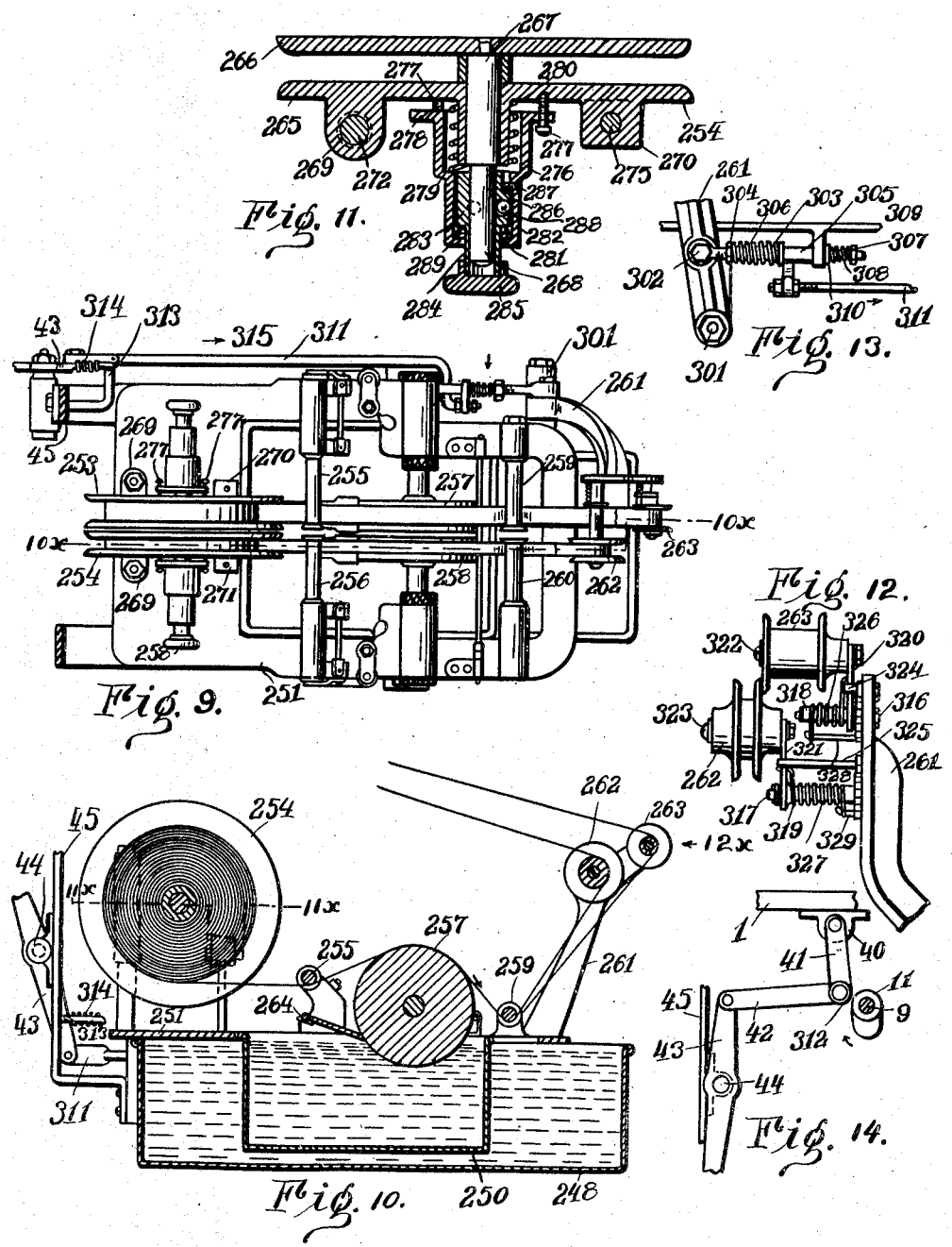

UNITED STATES PATENT OFFICE.

THOMAS JAMES CLARKE AND ARMAND ILLY, OF JAMESTOWN, NEW YORK, ASSIGNORS TO THE WILLIAM KOEHL COMPANY, OF JAMESTOWN, NEW YORK, A CORPORATION OF NEW YORK.

MACHINE FOR MAKING ROUND BOXES.

1,300,211.      Specification of Letters Patent.      Patented Apr. 8, 1919.

Original application filed June 26, 1911, Serial No. 635,517. Divided and this application filed May 16, 1914. Serial No. 838,990.

*To all whom it may concern:*

Be it known that we, THOMAS JAMES CLARKE and ARMAND ILLY, citizens of the United States, residing at Jamestown, in the county of Chautauqua and State of New York, have invented certain new and useful Improvements in Machines for Making Round Boxes, of which the following is a specification.

The object of this invention is to produce a machine for making round boxes.

Another object of this invention is to provide an automatic tension device for taking up the slack in the wrapping paper for the box and keep it under uniform tension.

These and other objects of this invention will be fully illustrated in the drawings, described in the specification and pointed out in the claims at the end thereof.

This application is a division of our prior application 635,517, filed June 26, 1911, for patent on box making machine now matured into Patent No. 1,098,314 issued on said application for a complete disclosure of the complete machine.

In the accompanying drawings

Fig. 2 is a sectional elevation of the forming heads, frame and forming wheel, showing the parts as they would appear when viewed from the right of Fig. 3.

Fig. 3 is a vertical section taken on the line 3×—3× of Fig. 2.

Fig. 4 is a side elevation of the paper feeding mechanism.

Fig. 5 is a top plan view of the upper portion of the parts shown in Fig. 4.

Fig. 6 is a section on the line 6×—6× of Fig. 4.

Fig. 7 is a section on the line 7×—7× of Fig. 4.

Fig. 8 is a section on the line 8×—8× of Fig. 5.

Fig. 9 is a top plan view of the mechanism for applying glue to the wrapping paper for the box.

Fig. 10 is a section on the line 10×—10× of Fig. 9.

Fig. 11 is a section on the line 11×—11× of Fig. 10.

Fig. 12 is a side elevation of the yielding takeup device looking at it in the direction of the arrow 12× in Fig. 10.

Fig. 13 is a side elevation of the driving mechanism of the yielding takeup device.

Fig. 14 is a detail side elevation of the operating lever for the takeup device.

In the accompanying drawings, like reference numerals indicate like parts.

Figure 1:
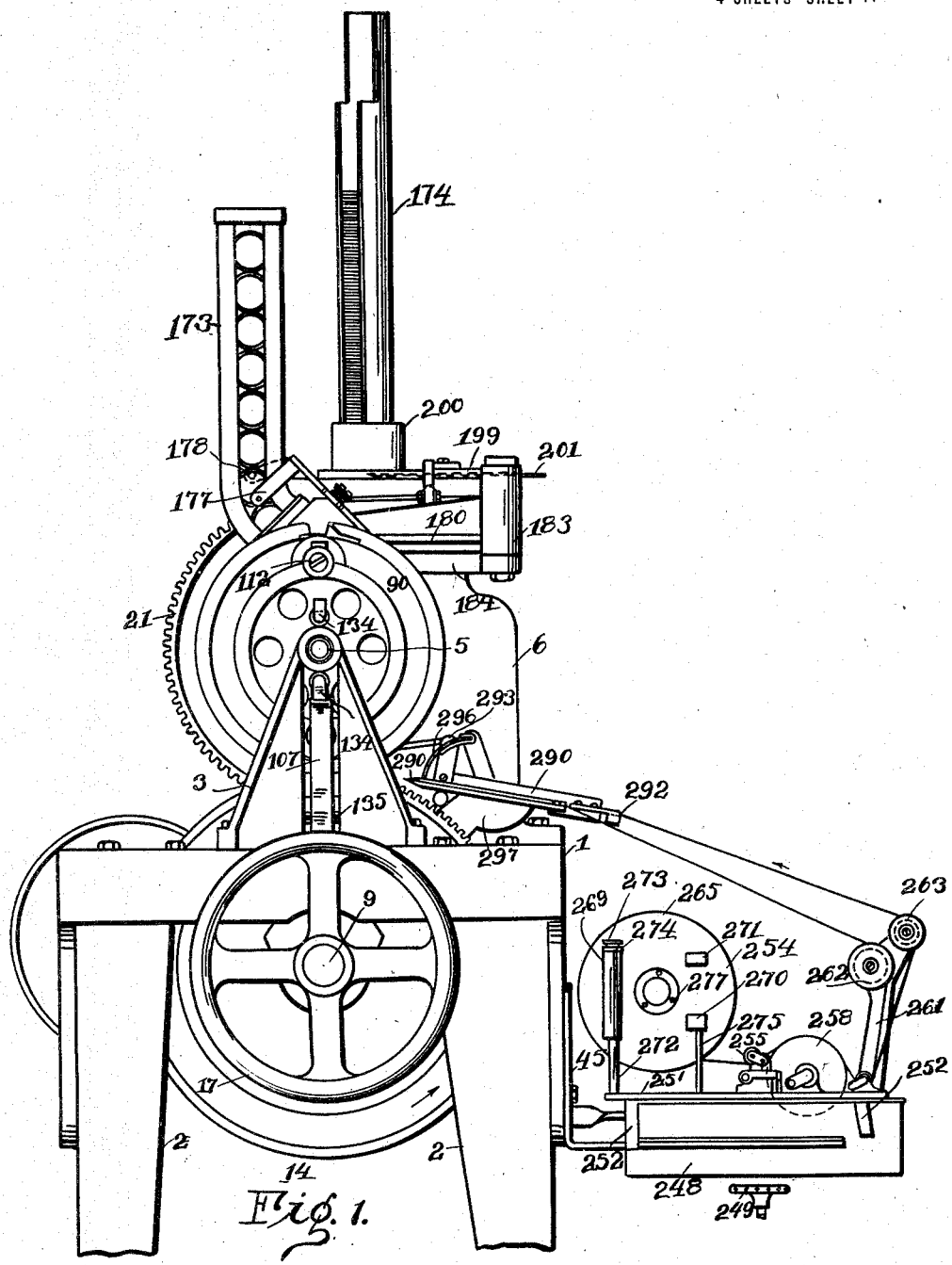
Figure 1 is an end elevation of the improved machine.

The improved machine comprises the bed plate 1 supported by suitable legs 2, 2 at the corners thereof. Mounted on the bed plate are suitable brackets such as 3 in Fig. 1 for the purpose of supporting the bearings for the auxiliary power shaft 5 of the machine. Also mounted on the bed plate is the bracket 6 which supports the feeding mechanism for feeding the box heads and box rings.

Below the bed plate 1 are fastened suitable brackets such as is shown at 8 for supporting the main power shaft 9 of the machine. This main power shaft 9 carries the cam 11 for operating the yielding takeup device. On the end of this shaft is provided a hand wheel 17 by which the power shaft may be turned manually.

Mounted under the bed plate 1 is the bracket 35 carrying the stud 36 on which is mounted the feeding device for the wrapping paper. (See Fig. 4.) The lever 297 is also pivotally mounted on the stud 36 below the bed plate 1 and is operated by the cam 13 on the shaft 9 for the purpose of moving the locking pin 39. (See Fig. 3.)

Also mounted on the bed plate 1 is the bearing 40 for the link 41 which connects to the link 42, which in turn is connected to the lever 43 which lever operates the yielding takeup device. The lever 43 is mounted to oscillate in the bearing 44 provided on the frame 45 fastened to the bed plate. (See Figs. 10 and 14.) The link 42 is reciprocated by the rotation of the cam 11 on the shaft 9.

Mounted on the shaft 5 at the left hand end is the box form supporting frame. The frame consists of a sleeve 90 mounted on the shaft 5, carrying a disk head 31 at the right hand end as shown in Fig. 3. This disk is provided with bearings 92 and 93, in which are supported the box form shafts 94 and 95. The shafts 94 and 95 are alike.

The shaft 94 carries on the end thereof one half of the box form 33, this half consisting of a flange that is formed integrally on the shaft or is shrunk thereon. Mounted to slide on this shaft is a sleeve 96 on the end of which is carried the other half of the box form 108. These two parts constituting the complete box form.

These box forms are each provided with a pinion 100 by which they are rotated.

Mounted on the main power shaft 9 is the forming wheel 14, which forming wheel is adapted to rotate in line with the box form heads 33 and 34. This box forming wheel carries thereon a segmental rack 114 which engages with the pinions 100 on the box forms for rotating.

Forged or shrunk on the shaft 5 is the disk 31 to which is fastened the frame 32 which rotates with the shaft.

The shaft 5, disk 31, sleeve 90 and the box forms, etc., carried thereon are all rotated in unison by a clutch or any other suitable means which will cause the shaft 5 and the parts connected thereto to rotate a half revolution and then stop with one of the box forms in contact with the forming wheel 14 which rotates continuously, it being understood that the box form 33 makes contact with the forming wheel during each odd number revolution of the forming wheel and the box form 34 makes contact with the forming wheel during each even number revolution of the forming wheel. The forming wheel is provided with a pressing and turning surface which is adapted to bear against the parts of the box that are assembled on the box form. It will also be understood that a box ring and a box head will be placed upon the upper box form in any suitable manner and the frame will then be rotated, bringing the box form to the lowest position where the box may be wrapped with a strip of gummed or pasted paper with the assistance of the forming wheel 14.

Mounted on the main power shaft 9 so as to rotate continuously therewith is the main forming wheel 14. This forming wheel consists of a disk having on the periphery thereof an annular groove 137, which groove extends clear around the disk and has the uniform cross sections shown in Fig. 3. This main forming wheel carries the segmental rack 114 and one or more forming sections arranged in the annular groove 137. These forming sections are for the purpose of pressing the paper against the box as it is delivered from the feed mechanism from the wrapping paper. It will be understood of course, that this wrapping paper is delivered in one, two or more strips as may be desired, each of the strips being coated with an adhesive on one side. Preferably the wider strip of paper is placed immediately and in contact with the box and is the strip which connects the bottom to the ring of the box. The second strip of paper is preferably of a different color and is generally for decoration only, and is preferably narrower than the ring of the box so that it does not overlap on the bottom of the box. The wide strip is pasted directly to the box. The second strip is pasted to the first strip and the third strip, if any would be pasted to a second strip or to the first strip or to both of the strips as might be desired.

As shown in Fig. 3 the forming section has a broad cylindrical surface intended to make contact with the side of the box and has a flange projecting upwardly from the side thereof with a groove between the flange and the main portion of the forming section for the purpose of accommodating the socalled French edge of the box. The cylindrical surface presses the wrapping paper against the side of the box and the flange turns it around the edge of the box and presses it against the bottom of the box.

The mechanism for coating the wrapping with glue or adhesive and feeding the wrapping paper to the machine will now be described.

Mounted on the bed plate 1 of the machine as shown in Fig. 1, is the supporting frame 45. This frame consists of two arms which extend downward and have lateral extensions thereof at the bottom. Supported on these lateral extensions is a water tank 248 under which water tank is provided a gas burner 249 in which gas is burned under the tank for the purpose of heating the tank and the water contained therein hot enough to keep paste in proper condition. Supported in the water tank is a paste tank 250. (See Fig. 10). Supported on the water tank is a frame 251 having four feet 252 thereon at the four corners thereof which feet center the frame on the tank and serve as a support for the frame when it is desired to take the frame away from the tank and place it elsewhere for any purpose whatever.

Supported on this frame 251 are the stationary spools 253 and 254 which carry the papers with which the boxes are to be wrapped. In front of these spools are supported the guide rollers 255 and 256 in front of which are the glue rollers 257 and 258. In front of these in turn are the guide rollers 259 and 260. Mounted at the end of the frame is the swinging arm 261 on which are mounted to rotate the guide rollers 262 and 263. The glue rollers 257 and 258 have their lower side immersed in the glue of the glue tank 250. The paper moves over and under the rollers in the direction indicated by the arrow in Fig. 10 and as the paper moves the glue roller revolves picking up glue from the tank below and spreads the glue on the underside of the paper which passes over it. Bearing against the glue rollers are the scrapers 264 which are yieldingly pressed against the glue rollers for the purpose of scraping therefrom the surplus glue.

The spool 253 is so constructed as to place a limited tension on the paper as it is unwound therefrom. The construction and mounting of the spool by which this result is obtained will now be described.

Each of these spools 253 and 254 consists of two disks 265 and 266. The disk 266 carries the stem 267 thereon which stem is cylindrical in shape and has the reduced end 268 thereon. The disk 265 has the lugs 269, 270 and 271 thereon. The lug 269 is perforated to receive the supporting pin 272 mounted on the frame 251 on which pin 272 the disk rests. The pin 272 is a tapered pin and the socket in the lug 269 which receives it is also tapered the parts being adapted to fit each other snugly so as to avoid wabbling of the disk on its supporting pin. The upper end of the perforation on the lug 269 is threaded to receive the bolt 273 and the lock nut 274. The bolt 273 can be adjusted to limit the distance of the pin 272 to enter the hole in the lug 269 by which a snug fit is secured between them and a crowding of parts that would interfere with the ready removal of the disk 265 is prevented. The lug 270 is also perforated to receive the supporting pin 275. The supporting pin 275 is near the guide, the weight being borne by the pin 272. The lug 271 is provided on the disk 275 for the purpose of making the casting interchangeable so that it may be used for forming either a right or a left hand disk. The lug 271 can be perforated to receive a pin on the opposite side corresponding to the pin 275. By boring the lug 269 from the opposite end from that shown in Fig. 1 and by putting the bolt 273 and lock nut 274 in to correspond the disk 265 can be used in the spool 253 instead of in the spool 254 as is shown in Fig. 9.

Attached to the disk 265 is the housing 276 loosely fastened thereon by several screws 277. This housing has a flange 278 through which the screws 277 may pass. It has also a shoulder 279 between which shoulder and the disk 275 is a compression spring 280. At the end of the housing 276 is a collar 281. The inner surface of the housing 276 is tapered at 282 for a purpose that will presently be explained. Inside of the housing and interposed between the reduced end 268 of the pin 267 and the tapered portion of the housing 282 is a sleeve 283, which sleeve has a reduced end 284 that passes out through the opening in the collar 281 and engages with the head or handle 285. The sleeve 283 has a longitudinal groove 286 therein which is engaged by the pin 287 which permits longitudinal movement of the sleeve along the housing. The sleeve 283 is provided with three circular recesses therein adapted to receive the balls 288, which balls make contact with the reduced end 268 of the pin 267 on the one side and the tapered portion 282 of the housing. The sleeve 283 is pressed forward and the housing is pressed backward, by the spiral spring 289. This causes the balls 288 to choke between the reduced end 268 and the tapered portion 282 clutching the two parts together. It will be seen that the housing and the pin 268 are always clutched together in the same place, and the housing 276 is brought closer to the disk 265 when the disks 265 and 266 are spaced farther apart. Between the disks 265 and 266 is carried the roll of paper which may be either wide or narrow according to the kind of work that is being done therewith. It is the width of this paper that determines the spacing apart of the disks 265 and 266 as it is the object of this part of the invention to draw the disks 265 and 266 together against the paper with a pressure that will be practically uniform at all times and for all widths of paper. This pressure is determined by the compression of the spring 280 which will exert a slightly greater pressure on a roll of wide paper than it will on a roll of narrow paper. To take the disks 265 and 266 apart it is only necessary to pull out on the head 285 and press in on the housing 276 which causes the clutch to be opened releasing the pin 268, permitting the ready removal of the disk 266 from the disk 265.

The guide rollers 255, 256, 259 and 260 consist of sleeves with a flange on each end thereof mounted to rotate freely on a supporting spindle. These rollers have a limited endwise movement on their spindles permitting the rollers to be separated in the middle of a space sufficient to permit of the ready insertion of the paper between them. The glue rollers 257 and 258 are supported to rotate on spindles, substantially the same as the guide rollers 255, etc.

After leaving the rollers 259 and 260, the paper strip passes over the guide rollers 262 and 263 and onto the paper feeding plate 290. The roller 263 feeds the wide strip of paper and the roller 262 feeds the narrow strip of paper, the wide strip being usually white and the narrow strip colored. The narrow stip feeds onto the feeding plate 290 though a narrow groove in a plate 291 and the wide strip through a wide groove in the plate 292. The plate 291 is adjustable laterally on the plate 290 on which the plate 292 is also supported, so that the two strips of paper can be superimposed one on the other in any desired adjustment. This adjustment of the plate 291 is secured by providing suitable slots in the plate 290 through which large headed screws pass to engage with the plate 291. These screws can be loosened and the plate 291 moved laterally by the screw 291ˣ and the screws tightened up, clamping the plate 290 between the heads of the screws and the plate 291.

Mounted on the plate 290 is the upright arm 293 on which is carried a sleeve 294 in which sleeve is rotatably mounted the pin 295 carrying a finger 296 thereon, the lower end of which presses against the plate 290, or against the strips of paper that will ordinarily lie between the finger 296 and the plate 290. This finger holds the paper securely in position while at rest ready for the next forward feed thereof onto the box that is being formed. The plate 290 is supported on the arm 297 pivoted on the stud 36 carried on the bracket 35 supported from the bed plate 1. The lever 297 is adjustable sidewise on the stud 36 by a construction that will now be described. The stud has a shoulder 340 thereon and has a large head 341 at the end thereof. The small end of it is threaded to be engaged by the nut 342 by which it is clamped in place. On the stud 36 is placed the sleeve 343 that is threaded. The lever 297 is centered to oscillate on this sleeve and can be adjusted laterally thereon by turning the nuts 344 and 345. This arm has at its lower end a pin 299 carrying an antifriction roller 300 thereon which antifriction roller is engaged by the cam 13 carried on the shaft 9 so that on the rotation of the shaft, the feeding plate is moved forward toward the lower box form.

A knife is provided in the forming wheel 14 for severing the paper, which knife leaves a half or three quarters of an inch of paper projecting out from the plate 290. The upper surface of this paper is gummed and as the plate 290 is moved forward by the cam 13, this gummed upper surface of the paper is applied to the under surface of the box on the lower box form and between the box and the forming wheel. This gummed paper adheres to the box which is being rotated with the box form so that the paper is drawn through the guide and applied to the box until the further forward movement of the paper is arrested by the action of the knife, cutting it off. When the feeding plate 290 moves forward to apply the paper to the box, the arm 261 supporting the rollers 262 and 263 must move forward with it as well. This arm and its rollers constitute a movable take up device the construction and operation of which will now be described.

The arm 261 is pivoted at 301. Pivoted to the arm 261 at 302 is the pin 303 having a nut 304 thereon. This pin plays into a sleeve 305; between this sleeve 305 and the nut 304 is placed the compression spring 306 surrounding the pin 303. This pin passes on through the sleeve 305 and carries on its outer end a nut 307 and on the pin 303 is placed the compression spring 308 between the sleeve 305 and the nut 307. The sleeve 305 travels through a bearing in a lug 309 carried on the frame 251. Between the sleeve 305 and the spring 308 is interposed a washer 310 which washer is independent of the sleeve. Attached to the sleeve 305 is the link 311 connected to the lever 43, which lever is pivoted at 44 and is attached on its upper end to a link 42. The other end of the link 42 is hung from the bed plate 1 by a link 41. The link 42 has an antifriction roller 312 which bears against the cam 11 on the power shaft 9 by which it is reciprocated.

Mounted on the frame 45 is a pin 313 to the outer end of which is attached a tension spring 314, the other end of which is attached to the lever 43 and by which the lever 43 and link 311 are normally moved in the direction of the arrow 315. The cam 11 operates to move the lever and link in the opposite direction against the tension of the spring, thus relieving the paper of the tension that would otherwise be thrown upon it by the spring 314. When the arm 261 moves in the reverse direction, the momentum of it is taken up by the spring 308 by which it is brought gradually to rest.

The rollers 262 and 263 are yieldingly mounted on the arm 261 in the manner I will now describe.

Fastened on the arm 261 are the pins 316 and 317 on which are mounted to oscillate the sleeves 318 and 319, each of which carries an arm 320 and 321, on which are supported the pins or studs 322 and 323 on which the rollers 263 and 262 are mounted to rotate. Stationary pins 324 and 325 are mounted on the arm 261 and the arms 320 and 321 are pressed back against these pins by the springs 326 and 327, which springs are fastened at one end to pins 328 and 329 and at the other ends to the arms 320 and 321. Spring 326 is the stiffer as it puts tension on the roller that carries the larger paper.

We claim:

1. In a box machine, the combination of a plate, a pair of guides thereon arranged in series for feeding separate overlapping strips of paper thereon, means for adjusting one of said guides laterally with respect to the other guide, the second guide being placed so as to feed the strip controlled thereby onto the other strip while passing over the first guide.

2. In a box machine, the combination of a plate, a pair of guides thereon for feeding separate strips of paper thereon, means for adjusting one of said guides laterally with respect to the other guide, means for shifting said feed plate forward and back to intermittently cause the feeding of the paper carried thereon.

3. In a box machine, the combination of a feed plate, a pair of guides thereon for feeding separate strips of paper thereon, means for shifting said feed plate forward and back to intermittently cause the feed of the paper carried thereon, a supply roll from which said paper strip is drawn, an idle roller over which said strip passes between said feeding plate and said supply roll, a swinging arm on which said idle roller is mounted, said arm swinging forward and back with said feed plate to take up the slack in said paper strip.

4. In a box machine, the combination of a feed plate for supporting a paper strip thereon, a supply roll from which said paper strip is drawn, a swinging arm interposed between said feed plate and said supply roll, a roller on said swinging arm over which said paper strip passes, means for moving said feed plate forward, means for moving said swinging arm forward to adjust it to the position of said paper strip, yielding connections between said swinging arm and said last named means.

5. In a box machine, the combination of a feed plate for supporting a paper strip thereon, a supply roll, from which said paper strip is drawn, a swinging arm interposed between said feed plate and said supply roll, a roller on said swinging arm over which said paper strip passes, means for moving said feed plate forward, means for moving said swinging arm forward to adjust it to the position of said paper strip, yielding connections between said swinging arm and said last named means, a glue applying roller interposed between said supply roll and said swinging arm.

6. In a box machine, the combination of a feed plate for supporting a paper strip thereon, a supply roll from which said paper strip is drawn, a swinging arm interposed between said feed plate and said supply roll, a roller yieldingly mounted on said swinging arm, over which said paper strip passes, means for moving said feed plate forward, means for moving said swinging arm forward to adjust it to the position of said paper strip, yielding connections between said swinging arm and said last named means.

7. In a box machine, the combination of a feed plate for supporting paper strips thereon, supply rolls from which said paper strips are drawn, a swinging arm interposed between said feed plate and said supply roll, rollers yielding mounted on said swinging arm over which said paper strips pass, means for moving said feed plate forward, means for moving said swinging arm forward to adjust it to the position of said paper strips, yielding connections between said swinging arm and said last named means.

In testimony whereof we affix our signatures in presence of two witnesses.

THOMAS JAMES CLARKE.
ARMAND ILLY.

Witnesses:
WILLIAM KOEHL,
VAN C. EGGLESTON.